July 24, 1962
V. STANZEL
3,045,391
MODEL AIRCRAFT
Filed Jan. 19, 1959
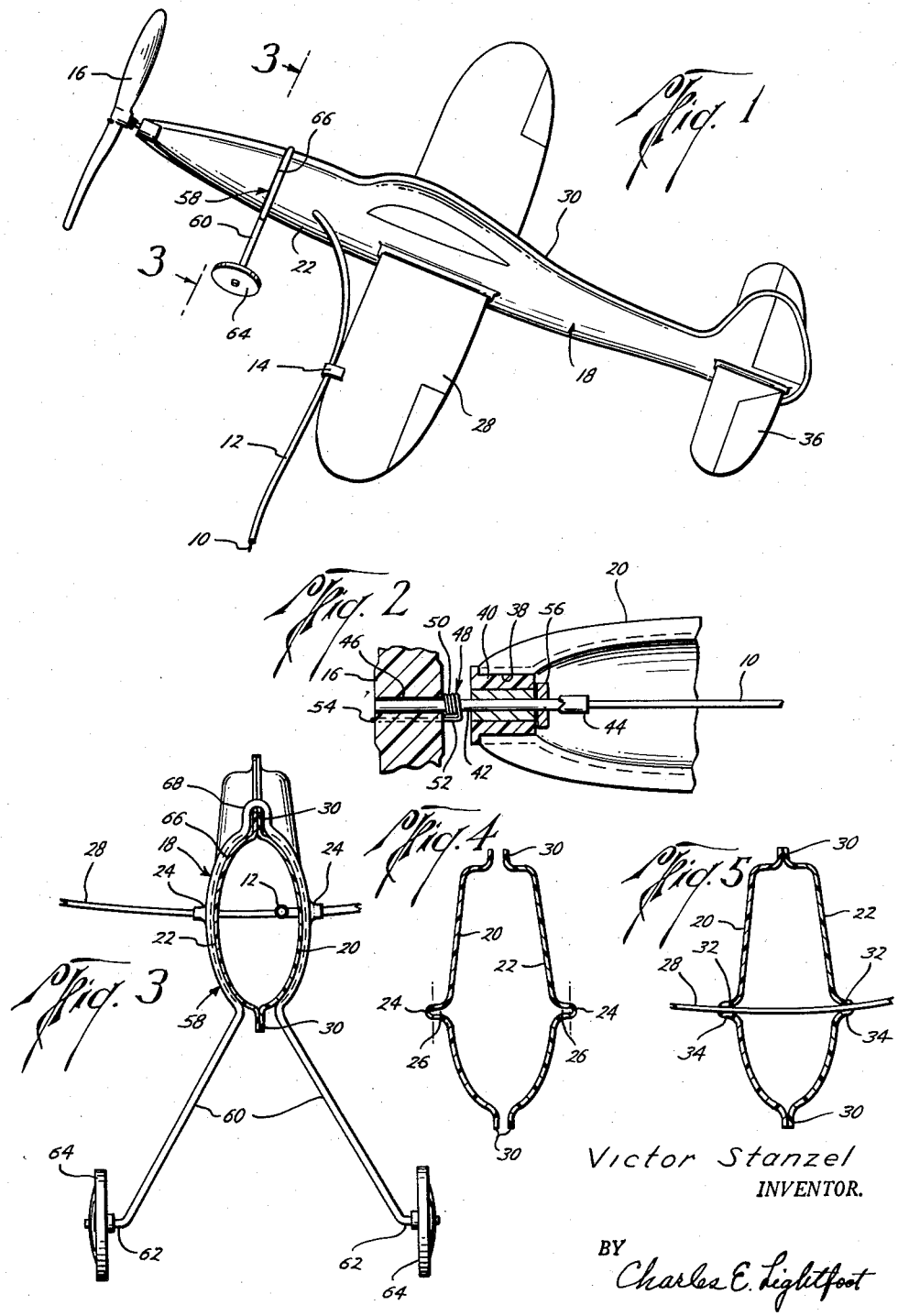
Victor Stanzel
INVENTOR.
BY Charles E. Lightfoot
ATTORNEY

United States Patent Office 3,045,391
Patented July 24, 1962

3,045,391
MODEL AIRCRAFT
Victor Stanzel, P.O. Box 171, Schulenburg, Tex.
Filed Jan. 19, 1959, Ser. No. 787,594
4 Claims. (Cl. 46—78)

This invention relates to model aircraft, and more particularly to a model airplane, which is designed to be driven by power from a remote source and whose flight may be controlled by an operator on the ground.

This application is a continuation-in-part of a prior application filed by the same applicant on February 28, 1958, under Serial Number 718,254.

The invention has for an important object the provision of a model aircraft which is of extremely light weight and which may be operated from a remotely located power source through the intermediation of a flexible driving cable.

Another object of the invention is to provide a model aircraft having a hollow fuselage of thin-walled, molded construction, whereby the weight of the aircraft may be reduced to a minimum while at the same time maintaining a maximum of strength and rigidity.

A further object of the invention is the provision in a model aircraft of a landing gear structure which is of strong and rugged construction, light in weight, and which is attached to the craft by means which is designed to prevent damage to the landing gear and the aircraft due to crash landing or other accident and to facilitate easy replacement.

Another object of the invention is to provide a model aircraft of the kind mentioned having propeller mounting and driving mechanism by which the propeller is securely connected to the power source to be rotated thereby and is easily replaceable when damaged.

A further object of the invention is the provision of a model aircraft having a fuselage of hollow, thin-walled, molded construction, having parts which are complementary in shape and which are provided with means whereby the parts may be readily assembled and cemented together to form a unitary structure of extremely light weight.

A further object of the invention is to provide a model aircraft having a fuselage of hollow, thin-walled construction and embodying means for attaching the wings of the aircraft to the fuselage in a manner to form a strongly braced and rigid structure.

A further object of the invention is to provide an improved method of forming and assembling a model aircraft of the kind mentioned, embodying a fuselage and wing structure of extremely light weight, yet having great rigidity and strength.

A further object of the invention is the provision of a model aircraft which is of simple design and rugged construction, capable of withstanding rough handling and hard usage, which is also of extremely light weight, and wherein the parts are easily replaceable.

The above and other important objects and advantages of the invention may best be understood from the following detailed description, constituting a specification of the same when considered in conjunction with the annexed drawings, wherein—

FIGURE 1 is a perspective view of the invention;

FIGURE 2 is a fragmentary, longitudinal, central, cross-sectional view, on an enlarged scale, showing details of structure of the propeller mounting and driving mechanism;

FIGURE 3 is a cross-sectional view, taken along the line 3—3 of FIGURE 1, looking in the direction indicated by the arrows;

FIGURE 4 is a transverse, cross-sectional view showing the cross-sectional shape of the parts of the fuselage of the aircraft before the same are secured together and illustrating the method by which the parts are prepared for assembly; and FIGURE 5 is a fragmentary transverse, cross-sectional view showing the parts of the fuselage of the aircraft assembled and secured together with the wings of the aircraft attached thereto, and illustrating the manner in which the wings are assembled with the parts of the fuselage to form a rigid and strongly braced structure.

Referring now to the drawings in greater detail, the model aircraft of the invention is of the type adapted to be driven by a flexible cable or wire 10, which is extended through a flexible tube 12, extending from a location on the ground and which is attached to one wing of the aircraft, as indicated at 14, and extends into the fuselage thereof. The flexible cable or wire 10 is extended through the tube 12 and is connected to the propeller 16 of the aircraft, whereby the propeller may be rotated by any suitable means, such as an electric motor, whose shaft is connected to the cable to rotate the cable, in which may be located on the ground under the control of an operator. The driving mechanism of the aircraft is of the type described and claimed in the co-pending application, Serial Number 718,254, filed February 28, 1958, by the same applicant.

The aircraft of the present invention comprises a hollow, thin-walled fuselage, generally designated 18, formed of two thin-walled, molded parts 20 and 22, which are of complementary shape and which are adapted to be assembled and cemented together with their longitudinal marginal portions in facing contact, as best illustrated in FIGURE 5. Each of the thin-walled, molded parts or halves of the fuselage is provided with a longitudinally extending, hollow, side projection 34, whose outer portion is adapted to be cut away, to form a side slot 26, as best illustrated in FIGURE 4, through which the wings of the aircraft 28, which are formed in one piece, may be inserted through the side walls of the fuselage and attached thereto, to form a strongly braced structure.

By forming the parts or halves of the fuselage separately, and providing them with longitudinally extending vertically positioned marginal flanges 30, the parts may be assembled in the manner illustrated in FIGURES 4 and 5 with the marginal flanges in facing contact, as best seen in FIGURE 5, so that the flanges 30 then form an external, central, reenforcing rib extending peripherally about the fuselage.

The parts may conveniently be formed by molding the same from sheet plastic, which is placed in a heated, softened condition on a mold having suitably shaped cavities, into which the material is drawn by suction, applied through orifices provided through the wall of the mold and which open into the cavities, so that the material is drawn out to a very thin condition. Sheets thus formed, in which the parts are of complementary shape are then assembled by applying a suitable solvent to the flat portion of one sheet and bringing the flat portions of the sheets into contact with the complementary parts in registration to cement the sheets together. The completed hollow fuselage is then cut out of the assembled sheets by a suitable die shaped to leave the fuselage, with the surrounding reenforcing rib formed by the marginal flanges 30. By thus forming the parts of molded plastic material, the fuselage may be made of extremely thin-walled construction and of much lighter weight than could be obtained by molding the fuselage in one piece or otherwise constructing the same.

When the parts or halves of the fuselage have been thus assembled and cemented together, the projections 24 of the parts may have their outer extremities cut away, as indicated in FIGURE 4, to open the slots 26 and receive the one piece wing structure of the aircraft in the manner shown in FIGURE 5, each of the projections providing upper and lower wall portions 32 and 34, respectively, whose inner faces will be in contact with the upper and lower faces of the wing structure 28, so that a suitable solvent may be applied along the sides of the slots and permitted to flow between the contacting surfaces of the wing and the walls of the slots by capillary action, whereby the wing structure will be securely cemented to the sides of the fuselage and will extend from side to side of the hollow body of the aircraft to form a strong and rigidly braced structure.

The body of the aircraft may be provided with suitable stabilizer and tail structure, including a one piece stabilizer 36 which is attached to the fuselage in the same manner and by the same means as described above in connection with the assembling and attachment of the wing structure of the aircraft.

At the forward end or nose of the fuselage the parts are shaped to provide an opening 38 within which a suitable bearing 40 is cemented, through which a tubular shaft 42 is rotatably extended, whose inner end is attached to the end of the flexible cable 10, as by means of crimping or flattening of the tube as indicated at 44, whereby the tube will rotate in the bearing 40 upon rotation of the flexible cable. The outer end portion of the tubular shaft 42 is extended forwardly beyond the bearing 40 and carries the propeller 16, which is provided with a central opening 46, through which the shaft is extended. The propeller 16 is detachably mounted on the outer end of the tubular shaft and is secured thereon by means of a releasable latching element 48, formed of wire and having a coil portion 50 surrounding the tubular shaft, and which is wound in the direction of rotation of the shaft, so that the coiled portion will be tightened into gripping engagement with the shaft as the shaft rotates to cause the latch member to rotate with the shaft. The turns of the coil 50 are of somewhat smaller internal diameter than the external diameter of the shaft, so that the coil will tightly grip the shaft when the shaft is forced through the turns. The latch member 48 has a forwardly extending portion 52, which is provided at its outer end with a portion 54 bent at right angles to the portion 52 in position to extend across the outer face of the hub portion of the propeller 16 to releasably retain the propeller on the shaft. It will be apparent that by this latch arrangement, the laterally bent forward end portion 54 of the latch member 48 may be released from the propeller to permit the propeller to be easily slipped off of the tubular shaft 42 and replaced by a new propeller, whereupon the latch member may again be snapped onto the propeller with the bent forward end 54 in engagement with the outer face of the hub portion of the propeller to securely hold the propeller on the shaft and cause the propeller to rotate therewith. The shaft 42 may have a stop element 56 thereon, positioned for engagement with the inner end of the bearing 40 to limit forward movement of the shaft in the bearing.

The landing gear of the aircraft of the invention takes the form of a wire loop 58, having downwardly diverging leg portions 60, whose lower ends are outwardly bent as indicated at 62 to form journal portions upon which the landing wheels 64 are rotatably mounted. The loop portion of the landing gear extends about the exterior of the fuselage within the external peripherally extending groove 66 formed therein to receive the same, and has an upwardly bent portion 68 which extends over the marginal flanges 30 of the fuselage along the top of the same. The loop portion of the landing gear is bent in a manner to grippingly engage the fuselage in the groove 66, to securely retain the landing gear in proper position on the aircraft, but to permit the loop portion to be displaced from the groove in the event of crash landing of the aircraft or other accident which might otherwise damage the landing gear and the fuselage.

The method of the invention, by which a hollow-walled model aircraft fuselage of extremely light weight is made, comprises molding the fuselage in two parts of plastic material, which are of complementary shape, each part having an external peripheral, marginal portion, formed with a flat face positioned for facing contact with the marginal portion of the other part when the parts are assembled, whereby the parts may be secured together by cementing the contacting marginal portions together. The method of the invention also includes forming each of the parts of the fuselage or body with an external elongated, hollow protrusion, whose outer extremity may be cut away to form parallel, spaced apart, externally projecting wall portions between which the wing of the aircraft may be extended through the fuselage when the parts are assembled with the upper and lower faces of the wing in contact with the inner faces of the wall portions of the projections to be cemented thereto.

In operating the model aircraft, constructed and assembled as described above, the flexible cable or wire 10 is connected at its remote end to an electric motor or other suitable means by which the cable may be rapidly rotated, the flexible tube 12 being anchored at 14 to the wing of the aircraft at a location laterally spaced from the fuselage and being free at its end remote from the aircraft. By rapidly rotating the cable 10 in the flexible tube the propeller 16 may be rotated to propel the aircraft, which will be stabilized in flight by the flexible tube, and may be caused to climb or dive by suitable twisting or rotation of the tube 12 on the cable. Because of the frictional contact of the cable with the internal wall of the flexible tube a clockwise torque or twisting force will be exerted on the tube upon clockwise rotation of the cable, as seen in FIGURE 1, which will be transmitted to the fuselage through the connection 14 of the tube to the wing 28 to cause the aircraft to climb in flight.

The construction of the model airplane of the invention is preferably such that the center of gravity of the plane is located slightly forwardly of the center of lift provided by the wings 28, so that in flight the plane will have a tendency to descend or nose down. Due to the friction of the cable 10 rotating in the flexible tube, the tube will tend to rotate or twist in a clockwise direction as viewed in FIGURE 1, so that the plane will move forward and the tendency to nose downwardly will be overcome causing the plane to rise when the speed of the propeller is sufficiently high.

By suitably twisting or rotating the tube 12, it will be apparent that the climbing and descending movements of the aircraft in flight may be readily controlled.

It will thus be seen that the invention, constructed and assembled as described above, provides a model aircraft of simple design, which is light in weight, resistant to crushing and in which the parts may easily be replaced.

The invention is disclosed herein in connection with a certain specific embodiment of the same, but it will be understood that this is intended by way of illustration only, and that various changes can be made in the construction and arrangement of the parts, within the spirit of the invention and the scope of the appended claims.

Having thus clearly shown and described the invention, what is claimed as new and desired to secure by Letters Patent is:

1. In a model aircraft having a rotatably mounted propeller shaft and a propeller having a central opening through which the shaft may be extended, means for holding the propeller on and causing the same to rotate with the shaft, comprising a coil formed of wire surrounding and in gripping contact with the shaft for rotation with the shaft and means on said coil positioned for engagement with said propeller to cause the propeller to rotate with the coil.

2. In a model aircraft having a rotatably mounted propeller shaft and a propeller having a central opening through which the shaft may be extended, means for releasably holding the propeller on and causing the same to rotate with the shaft, comprising a coil formed of wire mounted on and in gripping contact with the shaft for rotation with the shaft on one side of the propeller and means movably carried on said coil for movement to one position in engagement with the propeller to hold the propeller against rotation and longitudinal movement on the shaft and to another position out of engagement with the propeller to permit the propeller to be removed from the shaft.

3. In a model aircraft having a rotatably mounted propeller shaft and a propeller having a central opening through which the shaft may be extended, means for releasably holding the propeller on and causing the same to rotate with the shaft, comprising a coil formed of wire mounted on and in gripping contact with the shaft for rotation with the shaft on one side of the propeller and means on the coil positioned for engagement with the propeller to cause the propeller to rotate with the shaft and including a portion positioned for engagement with the propeller to hold the propeller against longitudinal movement on the shaft in a direction to remove the propeller from the shaft.

4. In a model aircraft having a rotatably mounted propeller shaft and a propeller having a central opening through which the shaft may be extended, means for releasably holding the propeller on and causing the same to rotate with the shaft, comprising a coil formed of wire mounted on and in gripping contact with the shaft for rotation with the shaft in engagement with one side of the propeller and means movably carried by the coil for movement to one position in engagement with the propeller to cause the propeller to rotate with the shaft and including a portion positioned to engage the other side of the propeller to hold the propeller on the shaft and to be disengaged from the propeller upon movement of said means to another position to permit the propeller to be removed from the shaft.

References Cited in the file of this patent

UNITED STATES PATENTS

| | | |
|---|---|---|
| 1,547,870 | Green | July 28, 1925 |
| 2,158,344 | Walker | May 16, 1939 |
| 2,289,872 | Brinkmann | July 14, 1942 |
| 2,516,526 | Norton | July 25, 1950 |
| 2,588,184 | Walsh | Mar. 4, 1952 |
| 2,588,604 | Archer | Mar. 11, 1952 |
| 2,621,441 | Worden | Dec. 16, 1952 |
| 2,674,063 | Irwin | Apr. 6, 1954 |
| 2,751,898 | Groat | June 26, 1956 |

FOREIGN PATENTS

| | | |
|---|---|---|
| 11,759 | France | May 4, 1910 |
| | (Addition to 408,853) | |
| 410,233 | France | May 14, 1910 |
| 274,993 | Germany | June 6, 1914 |